United States Patent
Upton

[11] 3,936,605
[45] Feb. 3, 1976

[54] EYEGLASS MOUNTED VISUAL DISPLAY
[75] Inventor: Hubert W. Upton, Arlington, Tex.
[73] Assignee: Textron, Inc., Providence, R.I.
[22] Filed: Feb. 14, 1972
[21] Appl. No.: 225,741

[52] U.S. Cl. .................................. 179/1 SP; 351/50
[51] Int. Cl.² ......................................... G02B 17/00
[58] Field of Search ........ 179/1 VS, 107 S; 178/6.8, 178/7.85; 351/50

[56] References Cited
UNITED STATES PATENTS

| | | | |
|---|---|---|---|
| 2,137,888 | 11/1938 | Fuller | 179/1 VS |
| 2,176,167 | 10/1939 | Comstock | 351/50 |
| 2,595,701 | 5/1952 | Potter | 179/1 VS |
| 3,170,979 | 2/1965 | Baldwin | 178/7.8 S |
| 3,205,303 | 9/1965 | Bradley | 179/6.8 |
| 3,230,819 | 1/1966 | Noxon | 340/27 R |
| 3,436,151 | 4/1969 | Conrose | 351/50 |
| 3,463,885 | 8/1969 | Upton | 179/1 VS |
| 3,609,235 | 9/1971 | Sawyer | 178/7.8 S |
| 3,666,887 | 5/1972 | Freeman | 178/7.8 S |

OTHER PUBLICATIONS

Electric Powered Vehicles Being Tested, Radio-Electronics, 1/1967 pp. 4 and 6.

Primary Examiner—Kathleen Claffy
Attorney, Agent, or Firm—Richards, Harris & Medlock

[57] ABSTRACT

A personal information system wherein an illuminated information source is viewed in a mirror located closer to the eye than the shortest focal length to present in focus a visual image to the eye so that it can be viewed unobtrusively superimposed over the existing visual scene during normal activities. In a further aspect, the invention provides reflected illuminated symbolic presentation for speech interpretation assistance.

21 Claims, 6 Drawing Figures

U.S. Patent  February 3, 1976  3,936,605
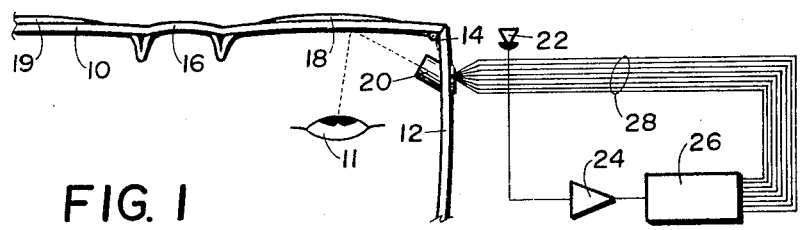
FIG. 1
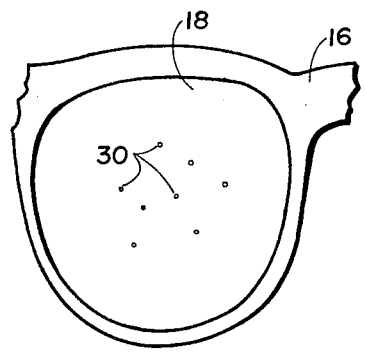
FIG. 2
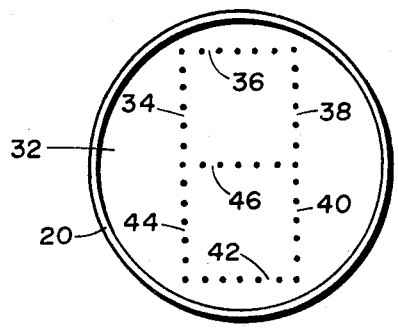
FIG. 3
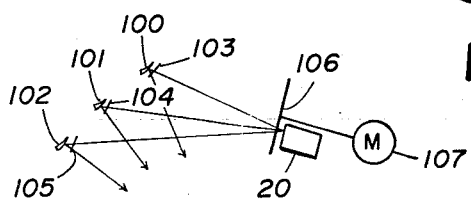
FIG. 6
FIG. 5
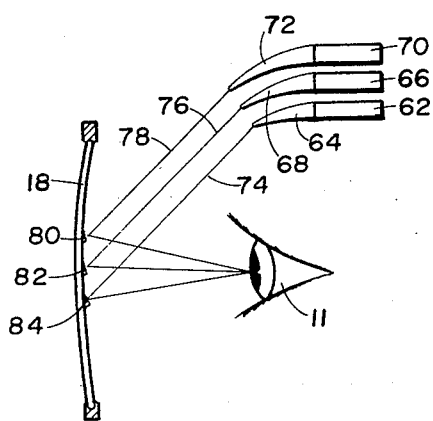
FIG. 4
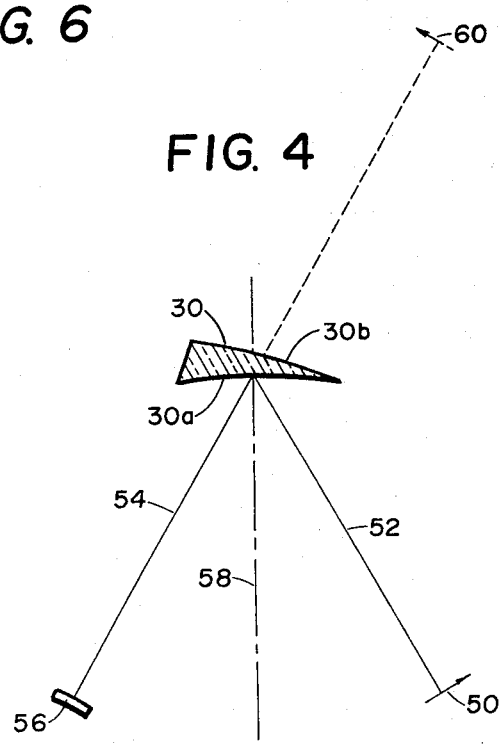

EYEGLASS MOUNTED VISUAL DISPLAY

This invention relates to a personal in focus information display.

In prior U.S. Pat. No. 3,463,885 a system was described and claimed wherein speech interpretation assistance was provided by energization of small lights or lamps mounted directly on the surface of an eyeglass. This, however, presents a problem in that there is no present method of presenting information in focus that is lightweight and small enough to be worn with ordinary spectacles. The bulbs mounted on the lens in accordance with the above-identified U.S. Pat. No. 3,463,885 are out of focus to the eye.

The present invention provides for the production of an in focus presentation giving a clear image while being less noticeable and less obstructive to the wearer'a vision than prior nonfocused systems to individuals other than the wearer of glasses employed to support the display system.

The utility of such displays for speech interpretation assistance is set out in said U.S. Pat. No. 3,463,885. The present invention is admirably suited for such use since characteristics of speech such as plosive sounds, fricatives and voicing can be symbolically presented in a manner that is readily interpretable by the wearer of eyeglasses embodying the present invention. A further aspect of the present invention is in formulation of wide angle, high resolution displays.

In accordance with the present invention, a viewing system is provided wherein an eyeglass lens supports a generally spherical mirror surface positioned with respect to the eye so that an information source is reflected to be visible via the mirror. The information source emanates light from a location at about the focal plane of the mirror so an image of the information source appears at the desired angle in the observers field of view. The mirror axis approximately bisects the angle between the information source and the eye. Means are provided for varying the source in response to predetermined information signals. The mirror may be adhered to an eyeglass or may be ground into an eyeglass lens. The display elements may be symbolic or may be detailed as desired.

For a more complete understanding of the present invention and for further objects and advantages thereof, reference may now be had to the following description taken in conjunction with the accompanying drawings in which:

FIG. 1 illustrates one embodiment of the invention wherein a display is provided for the wearer of a pair of eye-glasses;

FIG. 2 is a front view of the right lens portion of the glasses of FIG. 1;

FIG. 3 is a view of the face of the display unit 20 of FIG. 1;

FIG. 4 illustrates geometrical relationships involved in the system of FIGS. 1–3;

FIG. 5 illustrates a modification of the invention; and

FIG. 6 illustrates a further modification.

Referring now to FIG. 1, a lens bearing portion 10 of a pair of eyeglasses is hinged to an ear piece 12 for positioning by a wearer such that the wearer may view objects through lenses 18 and 19 in conventional manner. The embodiment of the invention here described will involve the right eye 11 as it views the right lens 18. Hinge 14 couples the ear piece 12 to the frame 10 with the usual nose rest 16 bridging the frame elements mounting lenses 18 and 19.

In accordance with one aspect of the present invention, a display unit 20 is secured to ear piece 12 out of the view of the wearer and is excited by sound detected by microphone 22 which is amplified in unit 24 and applied to a processor 26. In accordance with this embodiment of the invention, the unit 26 produces five output signals on the channels 28. The five output signals then are used to excite separate portions of the display on the face of the unit 20.

The lens 18 of the eyeglass 10, as best seen in FIG. 2, is provided with a plurality of small reflecting mirrors located at spaced points across the lens 18 such that the wearer when looking through lens 18 may also bring into his vision the information source reflected from one or more of the faces of the mirrors 30. In this embodiment, each of the mirrors 30 presents to the wearer, as viewed by the eye 11, a reflection of the complete display unit 20.

The display 20 may be as illustrated in FIG. 3. The display 20 includes an array of light emitting diodes. The diodes may be arranged in seven distinct and separately actuatable bars. The bars are arranged to form a figure eight when all are energized. Bars 34, 36, 38, 40, 42, 44 and 46 are separately and independently actuatable.

One of the lines 28 when energized will cause bar 34 to be illuminated. Another of the lines 28 will cause the bar 36 to be illuminated. Energization of other of the lines 28 will in a controlled and predetermined way illuminate the bars 38, 40, 42, 44 and 46.

Preferably for speech interpretation assistance, the unit 26 will process sound from microphone 22 such that frictional sound will cause bar 34 to be illuminated. Plosive sounds, such as forming the consonants $t$, $p$ or $k$ will cause the bar 38 to be illuminated. Bar 46 will be illuminated upon forming of voicing characteristics in speech as through the use of vowels.

Bar 44 will be illuminated in response to the combination of friction and voicing sounds. Bar 40 will be illuminated in response to voicing and plosion combined sounds.

It is of great value to provide a deaf person this unique possibility of seeing his voice. The method of analyzing voice sources as detected by microphone 22 in general is well known, one procedure being described in said prior U.S. Pat. No. 3,463,885. The utilization of such well known techniques to provide unique and meaningful in focus display to the user represents matter involved in the present invention. The intensity of light emitted by a given bar in FIG. 3 preferably will be proportional to the intensity of the particular component of sound detected by microphone 22.

Where display elements are available in color, one color is used for voicing sounds, a second color is used for fricative sounds, and a third color is used for plosive sounds.

In FIG. 2 the pattern of dots or mirrors 30 is somewhat random. An ordered pattern in the form of a V, symmetrical to the vertical and horizontal axes of lens 18, may be preferable.

The mirrors may be either of two different types of structure. One type of mirror is illustrated in FIG. 4 wherein the mirror 30 is a mirror having a spherical front surface 30a. The back surface 30b mates with or is secured to the back surface of lens 18. Mirror 30 may be adhesively secured onto the back of lens 18 and would be so ground and positioned such that the axis 58 of the surface 30a approximately bisects the angle between the line 52 leading from the information source 50 to the reflection point on mirror 30 and line 54 leading to the iris 56. The focal length of the mirror and a mirror and information source positions are such that the information source is in focus to eye 11. The visual acuity of the eye will influence the focal length and positioning and thus may be tailored to the individual. If a high resolution image is required, the mirror will have an aspheric surface with a matching aspheric surface at the image plane to correct for distortion. One method of making an information source which is aspheric is by the use of fiber optics. In FIG. 5, the virtual image 60 of the information source 50 is shown in the desired geometry. Preferably, each mirror will encompass a field of about 7° of the field of view. The use of light emitting diodes of small size permits switching then on and off in a manner well known and makes possible the production of images for symbolic displays of the type above described. The geometry is such that the exit pupil of the mirror is positioned directly in the field of view of the eye when looking directly at one of the mirrors. The exit pupil is generally understood to be fixed in terms of the pivot point of the eye 11. The exit pupils of all the mirrors is formed in substantially the same plane.

The wearer of the device of FIGS. 1–4 will look at a miniature opaque mirror to see an in focus image that is superimposed directly over a background including the space occupied by the mirror. Because a miniature mirror is used close to the eye, it is out of focus to the eye. The wearer has vision around it. The mirror does not obscure the visual background but at the same time, it can reflect an image of several degrees which appears superimposed upon the background. The small size of the mirror and closeness of the mirror to the eye provide the ability to have an image of apparent substantial size superimposed on an unobscured background.

Many prior systems have used concave mirrors to present virtual images. In general they have been much larger than the mirrors used herein. If a large mirror is opaque, it obscures the background. If the background and image are to be seen simultaneously with the large mirror, the mirror must be semitransparent which means the light is split between the image and background. If it is a 50 percent reflective mirror, both the image and background are reduced in brightness to the observer by 50 percent. In the present case, there is no reduction in brightness. Rather there is provided a capability of projecting an image without a significant light loss in comparison with conventional systems without diminishing the background brightness. The wearer sees a virtual image which is in focus, erect and magnified.

In an alternate construction, the mirrors are formed by grinding them separately and individually into lens 18.

FIG. 5 illustrates a multiple image display from multiple sources. Such a system has utility in the area of assistance to the deaf. It is also useful in presentation and display of information to an individual where the microphone of FIG. 1 is not used, but where separate sources of information are employed. More particularly in FIG. 5, lens 18 is provided with three separate mirrors 80, 82 and 84. Mirror 80 is associated with a display produced by a set of fiber optics 72 actuated or illuminated from an information source 70. The light path from the image source 72 is by way of path 78. Similarly, information sources 66 and 62 provide for illumination of fiber optic bundles 68 and 64. The image produced on optic bundle 68 is directed along path 76 to mirror 82 and thence to eye 11. The image of bundle 64 by way of path 72 is reflected from mirror 84 to eye 11. By this means there can be provided a multiple image display from multiple sources. The array of mirrors may have any configuration desired on lens 18. The mirrors can be positioned so that the three information sources 64, 68 and 72 may be viewed separately, one in each of the mirrors. In each case, the information source would be the ends of the fiber bundles. The signal generators 62, 66 and 70 may be small high resolution cathode ray tubes or other generating means.

An aspheric information source to be viewed in the mirrors may be formed with the ends of fiber optic bundles 64, 68 or 72 suitably shaped. It will be understood that several quite distinct types of displays are contemplated herein. In a first type of display, multiple mirrors reflect information from several information sources, one mirror for each source such as in FIG. 5.

In a second type of display, multiple mirrors reflect a single image at several points over a wide angle, permitting the wearer to see the same image directly in front, to the left or to the right by the use of a mirror in each position as in FIGS. 1–4.

In a third type of display shown in FIG. 6, multiple mirrors 100, 101 and 102 may reflect the image from a single source 20 which has a changing pattern that is displayed on each mirror in sequence. In this case, a means of switching the mirrors on in sequence is employed such as light polarizers 103, 104 and 105 positioned between each mirror and the eye cooperating with a light polarizer 106 positioned between the information source and the mirrors and rotated by suitable means such as motor 107. Polarizers 103–105 at the mirrors may each have a different orientation. Polarizer 106 at the source upon rotation will cause light to be passed to mirrors 100–102 in succession. In this manner the wearer will see an image in succession in small spaced mirrors. By proper sequencing of the information source and simultaneous rotation of a polarizer a composite wide field of view can be generated.

The display generator can be an array of light emitting diodes, CRT or other means. The generator may have a scan pattern and image content so that the multiple segments can be scanned in sequence to form a single wide field of view image. For example, a sensor such as television pickup or infrared pickup may scan, in darkness, over a wide angle to show an image to the viewer that could not be seen with the unaided eye.

A symbolic type of presentation may be provided to assist the deaf in interpreting speech. Imaging displays of substantially high resolution may be provided. In each case an image of an information source will be presented in focus unobtrusively superimposed over a normal field of vision.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a personal information system where a light variable display is located out of view at the side of the eye of a person, the improvement which comprises:
   a. a generally spherical mirror subtending a solid angle of not more than about 7° of the field of vision of said person when positioned in front of said eye at a distance less than the minimal focal length of said eye, and
   b. structure for supporting said mirror at about said distance from said eye and for supporting said display at about the focal length of said mirror at a location such that the mirror axis bisects the angle between said light source and said eye.

2. A personal information system which comprises:
   a. a matrix of voltage actuated light sources,
   b. at least one mirror subtending a solid angle when viewed by an eye of not more than about 7° when supported in front of said eye at about the location of an eyeglass lens for reflecting said sources to said eye,
   c. means for supporting said sources at the side of said eye a distance from said mirror at about the focal length of said mirror, and
   d. means for controlling said sources to actuate in real time different parts of said matrix in response to different parts of said information.

3. A personal information system which comprises:
   a. an eyeglass having at least one mirror surface thereon which because of proximity is out of focus to the eye of the wearer of said eyeglass and which is of size to subtend a solid angle of only a few degrees in the field of vision of said wearer, and
   b. an information source positioned to the side of said eye to be viewed via said mirror and located at about the focal length of said mirror to present to said wearer an in focus image of said source unobtrusively superimposed on the background scene viewed by said wearer.

4. The combination set forth in claim 3 in which a plurality of said mirror surfaces are distributed in an array on said eyeglass and each positioned to reflect light from said information source to the eye of said wearer.

5. The combination set forth in claim 3 in which a plurality of mirror surfaces are provided and a plurality of information sources are positioned to be viewed by said wearer each separately through one of said mirrors.

6. The combination set forth in claim 3 wherein said information source includes means responsive to spoken intelligence for transforming the same into voicing related displays.

7. The combination set forth in claim 3 wherein a plurality of mirror surfaces are provided on said eyeglass in a random array throughout the field of vision of said wearer.

8. The combination set forth in claim 3 wherein said mirror surface is formed by a mirror element secured to said eyeglass.

9. The combination set forth in claim 3 wherein said mirror surface is ground into the surface of said eyeglass.

10. The combination set forth in claim 3 wherein said mirror surface is shaped to present a magnified image of said information source.

11. The combination set forth in claim 3 wherein a plurality of mirror surfaces are provided on said eyeglass and each presents to said wearer the image of a portion of said information source.

12. The combination set forth in claim 3 wherein a plurality of mirror surfaces are provided on said eyeglass and wherein means are provided for presenting an image of said information source successively in time on different ones of said mirror surfaces.

13. The combination set forth in claim 3 wherein said information source is an array of light emitting diodes.

14. The combination set forth in claim 3 wherein said information source is a cathode ray tube.

15. The combination set forth in claim 3 wherein said information source comprises an array of light emitting diodes of the configuration H and wherein means are provided for separate actuation of the five bars of said H configuration.

16. A personal information system which comprises:
   a. an eyeglass having at least one mirror surface thereon which because of proximity is out of focus to the eye of the wearer of said eyeglass and which is of size to subtend a solid angle of only a few degrees in the field of vision of said wearer,
   b. an information source comprising an array of light emitting diodes of the configuration H positioned to the side of said eye to be viewed via said mirror and located at about the focal length of said mirror to present to said wearer an in focus image of said source unobtrusively superimposed on the background scene viewed by said wearer,
   c. a first means which illuminates a first H bar in response to voiced frictional sounds,
   d. second means which illuminates a second H bar in response to plosive sounds,
   e. a third means which illuminates a third H bar in response to voicing of vowels,
   f. a fourth means which illuminates a fourth H bar in response to the presence of combined friction and vowel sounds, and
   g. a fifth means which illuminates a fifth H bar in response to the presence of both vowel and plosive sounds.

17. A personal information system which comprises:
   a. an eyeglass having at least one mirror surface thereon which because of proximity is out of focus to the eye of the wearer of said eyeglass and which is of size to subtend a solid angle of only a few degrees in the field of vision of said wearer,
   b. an information source comprising an array of light emitting diodes of the configuration H positioned to the side of said eye to be viewed via said mirror and located at about the focal length of said mirror to present to said wearer an in focus image of said source unobtrusively superimposed on the background scene viewed by said wearer, and
   c. control means causing the upper left H bar to be illuminated in response to voiced frictional sounds, the upper right H bar to be illuminated in response to plosive sounds, the horizontal H bar to be illuminated in response to voicing vowels, the lower left H bar to be illuminated in response to the presence of combined friction and voicing sounds, and the lower right H bar to be illuminated in response to the presence of both voicing and plosion sounds.

18. The method of assisting speech interpretation which comprises:
   forming by reflection from a magnifying mirror subtending a solid angle of not more than about 7° in the field of vision on an eyeglass in focus images of an information source located at about the focal plane of said mirror, which source emits light from a plurality of discrete sources separately illuminated in response to frictional, plosive and vowel voicing characteristics.

19. The method of assisting speech interpretation which comprises:
   a. forming by reflection from a magnifying mirror subtending a solid angle of not more than about 7° in the field of vision on an eyeglass in focus images of an information source located at about the focal plane of said mirror in response to frictional, plosive, and vowel voicing characteristics.

20. The method set forth in claim 19 in which frictional, plosive, and vowel voicing characteristics are separately signaled on said information source and wherein predetermined combinations thereof are separately signaled.

21. The method of presenting information to the wearer of an eyeglass which comprises:
   a. forming a light emitting information display in a region on the same side of said glasses as the wearer thereof and out of view of said wearer, and
   b. reflecting with magnification light from said source from a mirror surface subtending a solid angle in the field of view of said wearer of not more than about 7° at the distance from the eye of said wearer as said eyeglass after travel from said source of a distance about the focal length of said mirror to present an in focus image of said source to said wearer while permitting view of the scene beyond said mirror in brightness substantially undiminished by the presence of said mirror.

* * * * *

PO-1050
(5/69)

UNITED STATES PATENT OFFICE
CERTIFICATE OF CORRECTION

Patent No. 3,936,605          Dated   February 3, 1976

Inventor(s)  Hubert W. Upton

It is certified that error appears in the above-identified patent and that said Letters Patent are hereby corrected as shown below:

Col. 1, lines 17-20, should read --The present invention provides for the production of an in focus presentation giving a clear image while having the advantages over prior nonfocused systems of being less obstructive to the wearer's vision and less noticeable to individuals other than the wearer of the glasses employed to support the display system.--;
      line 28, "in" should be --the--.
Col. 2, line 30, "other" should be --others--;
      line 45, "his" should be --a--.
Col. 3, line 6, "a" should be --the--;
      line 9, after "thus" insert --the eyeglasses--;
      line 14, change "5" to --4--;
      line 19, "then" should be --them--.
Col. 4, line 7, "72" should be --74--.

Signed and Sealed this

Thirteenth Day of July 1976

[SEAL]

Attest:

RUTH C. MASON
*Attesting Officer*

C. MARSHALL DANN
*Commissioner of Patents and Trademarks*